US012688412B2

(12) United States Patent
Kato et al.

(10) Patent No.: US 12,688,412 B2
(45) Date of Patent: Jul. 21, 2026

(54) TRAINING METHOD, STORAGE MEDIUM, AND TRAINING DEVICE

(71) Applicant: FUJITSU LIMITED, Kawasaki (JP)

(72) Inventors: Keizo Kato, Kawasaki (JP); Akira Nakagawa, Sagamihara (JP)

(73) Assignee: Fujitsu Limited, Kawasaki (JP)

( * ) Notice: Subject to any disclaimer, the term of this patent is extended or adjusted under 35 U.S.C. 154(b) by 926 days.

(21) Appl. No.: 17/699,363

(22) Filed: Mar. 21, 2022

(65) Prior Publication Data

US 2022/0207371 A1    Jun. 30, 2022

Related U.S. Application Data

(63) Continuation of application No. PCT/JP2019/037370, filed on Sep. 24, 2019.

(51) Int. Cl.
| | |
|---|---|
| *G06N 3/045* | (2023.01) |
| *G06N 3/0455* | (2023.01) |
| *G06N 3/047* | (2023.01) |
| *G06N 3/0499* | (2023.01) |
| *G06N 3/08* | (2023.01) |
| *G06N 3/088* | (2023.01) |
| *G06N 7/01* | (2023.01) |

(52) U.S. Cl.
CPC .............. *G06N 3/08* (2013.01); *G06N 3/045* (2023.01); *G06N 3/0455* (2023.01); *G06N 7/01* (2023.01)

(58) Field of Classification Search
CPC .......... G06N 3/08; G06N 3/045; G06N 3/047; G06N 7/01; G06N 3/088
See application file for complete search history.

(56) References Cited

U.S. PATENT DOCUMENTS

| | | | |
|---|---|---|---|
| 2018/0253640 A1* | 9/2018 | Goudarzi | G06N 3/0455 |
| 2019/0251418 A1 | 8/2019 | Nakanishi et al. | |

(Continued)

FOREIGN PATENT DOCUMENTS

| | | |
|---|---|---|
| JP | 2019-140680 A | 8/2019 |

OTHER PUBLICATIONS

Balle et al., Variational Image Compression With a Scale Hyperprior, May 1, 2018 (Year: 2018).*

(Continued)

*Primary Examiner* — Tamara T Kyle
*Assistant Examiner* — Jacqueline C. Meyer
(74) *Attorney, Agent, or Firm* — Fujitsu Intellectual Property Center

(57) ABSTRACT

A training method of an autoencoder that performs encoding and decoding, for a computer to execute a process includes encoding input data by the autoencoder; obtaining a probability distribution of feature data obtained by encoding the input data; generating first decoded data by decoding the feature data by the autoencoder; adding a noise to the feature data by the autoencoder; generating second decoded data by decoding the feature data to which the noise is added by the autoencoder; and training the autoencoder to train the probability distribution of the feature data so that a first error between the first decoded data and the input data, a second error between the first decoded data and the second decoded data, and an information entropy of the probability distribution are decreased.

12 Claims, 9 Drawing Sheets

(56) References Cited

U.S. PATENT DOCUMENTS

| | | | | |
|---|---|---|---|---|
| 2020/0372654 | A1* | 11/2020 | Kohl | A61B 5/0033 |
| 2021/0056954 | A1* | 2/2021 | Karita | G10L 15/02 |

OTHER PUBLICATIONS

Zurn, But what is an Autoencoder?, Feb. 24, 2019 (Year: 2019).*
Bazrafkan, Latent space mapping for generation of object elements with corresponding data annotation, Oct. 23, 2018 (Year: 2018).*
Stewart, Comprehensive Introduction to Autoencoders, Apr. 14, 2019 (Year: 2019).*
Duda, Gaussian AutoEncoder, Jan. 14, 2019 (Year: 2019).*
Xu, Unsupervised Anomaly Detection via Variational Auto-Encoder for Seasonal KPIs in Web Applications, Feb. 12, 2018 (Year: 2018).*
Audhkhasi et al., Noise-enhanced convolutional neural networks, Oct. 19, 2015 (Year: 2015).*
Bengio et al., Representation Learning: A Review and New Perspectives, Apr. 23, 2014 (Year: 2014).*
Moawad, Neural networks and backpropagation explained in a simple way, Feb. 23, 2017 (Year: 2017).*
Liano, Robust Error Measure for Supervised Neural Network Learning with Outliers, Jan. 1996 (Year: 1996).*
Lupo, Variational Autoencoder for unsupervised anomaly detection, Mar. 2019 (Year: 2019).*
Chu, Perspectives on the variational autoencoder, Nov. 4, 2018 (Year: 2018).*
G.E. Hinton et al., "Reducing the Dimensionality of Data with Neural Networks", Science, vol. 313, Issue No. 5786, pp. 504-507, Jul. 28, 2006 (Total 4 pages).
Diederik P. Kingma et al., "Auto-Encoding Variational Bayes", In International Conference on Learning Representations (ICLR), pp. 1-14, [online] arXiv:1312.6114v10 [stat.ML], May 1, 2014 (Total 14 pages).

Bo Zong et al., "Deep Autoencoding Gaussian Mixture Model for Unsupervised Anomaly Detection", In International Conference on Learning Representations (ICLR 2018), pp. 1-19, 2018 (Total 19 pages).
Johannes Balle et al., "Variational Image Compression with a Scale Hyperprior", In International Conference on Learning Representations (ICLR 2018), pp. 1-23, 2018 [online] arXiv:1802.01436v2 [eess.IV], May 1, 2018 (Total 23 pages).
Noriyasu Omata, "Low-dimensionalization via Auto-encoder and Visualization", Journal of the Visualization Society of Japan, vol. 38, No. 151, pp. 9-13, ISSN 0916-4731, Oct. 1, 2018 (Total 9 pages) partial translation (Cited in ISR).
Toshiki Nozaki et al., "Feature Selection in Adaptive Regularization of Weight Vectors via Sparse Estimation", Bulletin of the Computational Statistics of Japan, vol. 29, No. 2, pp. 117-131, ISSN 0914-8930, Feb. 11, 2017 (Total 19 pages) (Cited in ISR).
International Search Report and Written Opinion of the International Searching Authority (Form PCT/ISA/210, 220, and 237), mailed in connection with PCT/JP2019/037370 and mailed Dec. 3, 2019 (Total 10 pages).
International Search Report and Written Opinion of the International Searching Authority for International Application No. PCT/JP2019/037371, mailed Dec. 3, 2019 (11 pages).
USPTO—Non-Final Office Action mailed on Feb. 13, 2025 for pending U.S. Appl. No. 17/697,716.
USPTO—Non-Final Office Action for U.S. Appl. No. 17/697,716 mailed Nov. 26, 2025.
USPTO—Final Office Action for U.S. Appl. No. 17/697,716 mailed Apr. 24, 2026.
Tuan-Hung Vu et al., "ADVENT: Adversarial Entropy Minimization for Domain Adaptation in Semantic Segmentation", arXiv:1811.12833v2, pp. 1-12, Apr. 17, 2019.

* cited by examiner

FIG. 1

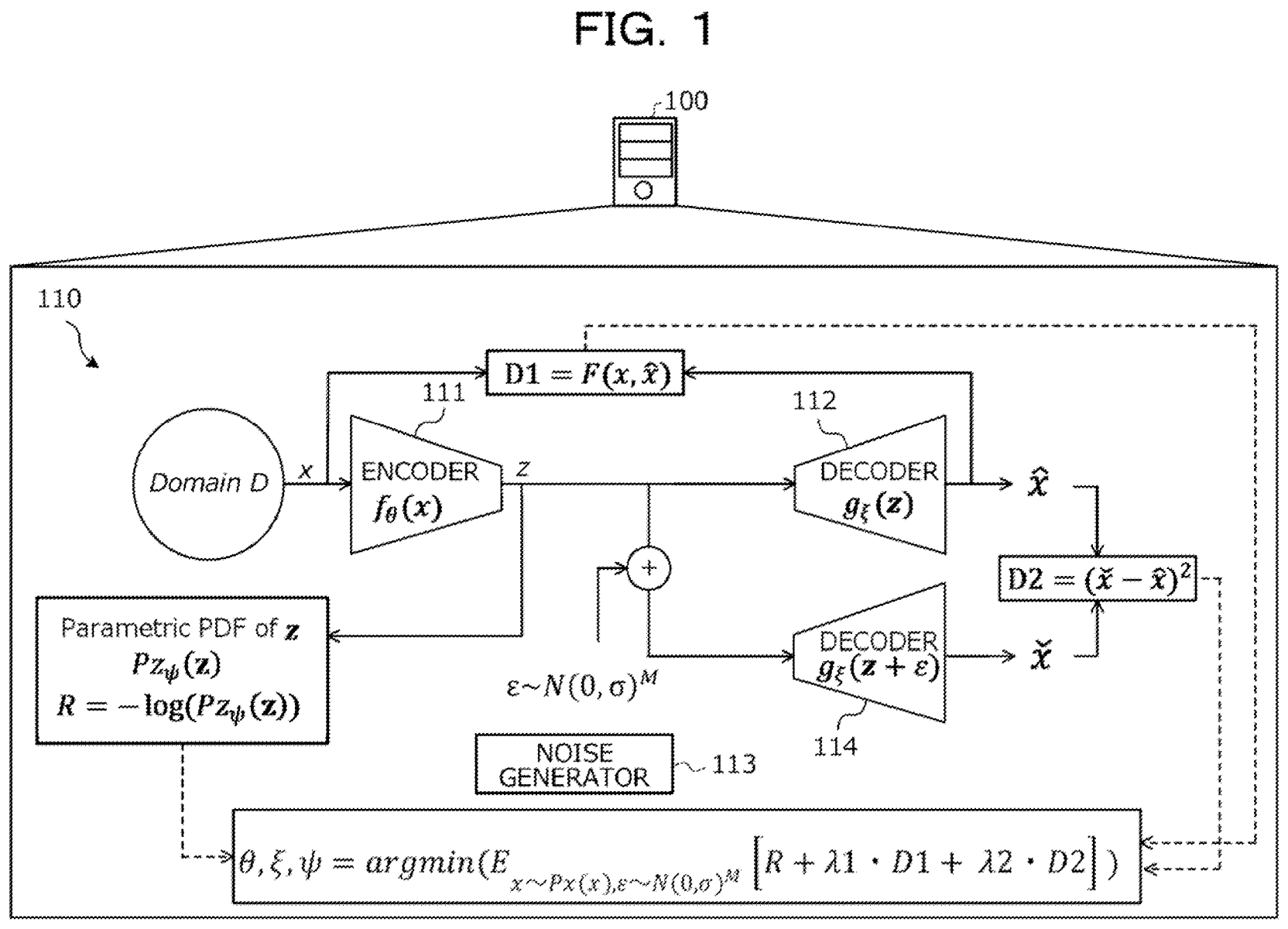

$$\theta, \xi, \psi = argmin(E_{x \sim Px(x), \varepsilon \sim N(0,\sigma)^M} \left[ R + \lambda 1 \cdot D1 + \lambda 2 \cdot D2 \right])$$

$$D1 = F(x, \hat{x})$$

$$D2 = (\breve{x} - \hat{x})^2$$

ENCODER $f_\theta(x)$

DECODER $g_\xi(z)$

DECODER $g_\xi(z + \varepsilon)$

NOISE GENERATOR $\varepsilon \sim N(0, \sigma)^M$

Domain D

Parametric PDF of $z$ $Pz_\psi(z)$ $R = -\log(Pz_\psi(z))$

Figure 4:
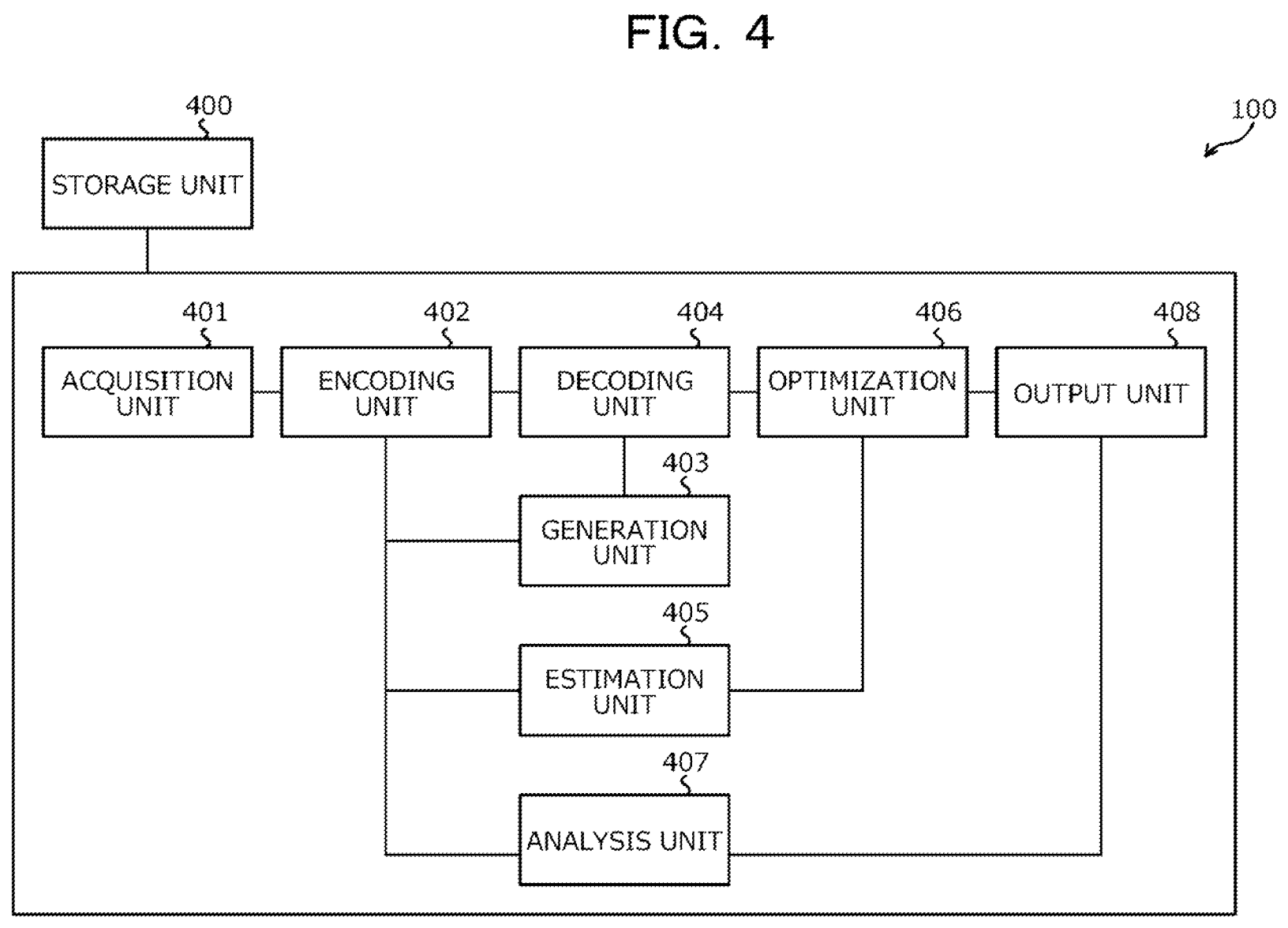

| 400 |
| STORAGE UNIT |

| 401 |
| ACQUISITION UNIT |

| 402 |
| ENCODING UNIT |

| 404 |
| DECODING UNIT |

| 406 |
| OPTIMIZATION UNIT |

| 408 |
| OUTPUT UNIT |

| 403 |
| GENERATION UNIT |

| 405 |
| ESTIMATION UNIT |

| 407 |
| ANALYSIS UNIT |

FIG. 5

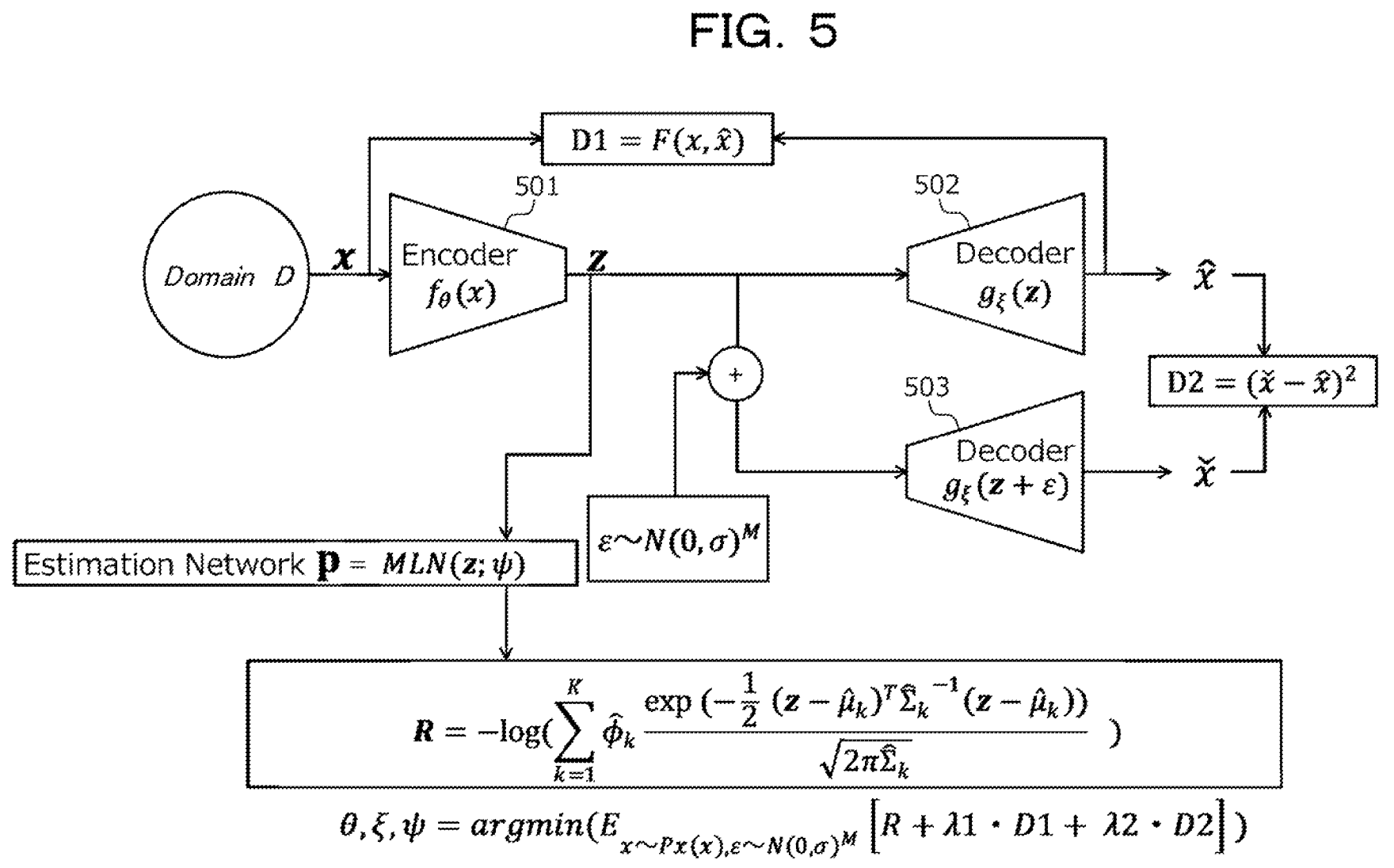

$$D2 = (\breve{x} - \hat{x})^2$$

Decoder $g_\xi(z)$  502

Decoder $g_\xi(z + \varepsilon)$  503

$\hat{x}$ $\breve{x}$ $D1 = F(x, \hat{x})$

Encoder $f_\theta(x)$  501

$x$

Domain $D$ $z$ $+$ $\varepsilon \sim N(0, \sigma)^M$

Estimation Network $\mathbf{p} = MLN(z; \psi)$ $$R = -\log\left(\sum_{k=1}^{K} \hat{\phi}_k \frac{\exp\left(-\frac{1}{2}(z - \hat{\mu}_k)^T \hat{\Sigma}_k^{-1}(z - \hat{\mu}_k)\right)}{\sqrt{2\pi \hat{\Sigma}_k}}\right)$$

$$\theta, \xi, \psi = argmin(E_{x \sim Px(x), \varepsilon \sim N(0, \sigma)^M}\left[R + \lambda 1 \cdot D1 + \lambda 2 \cdot D2\right])$$

FIG. 6

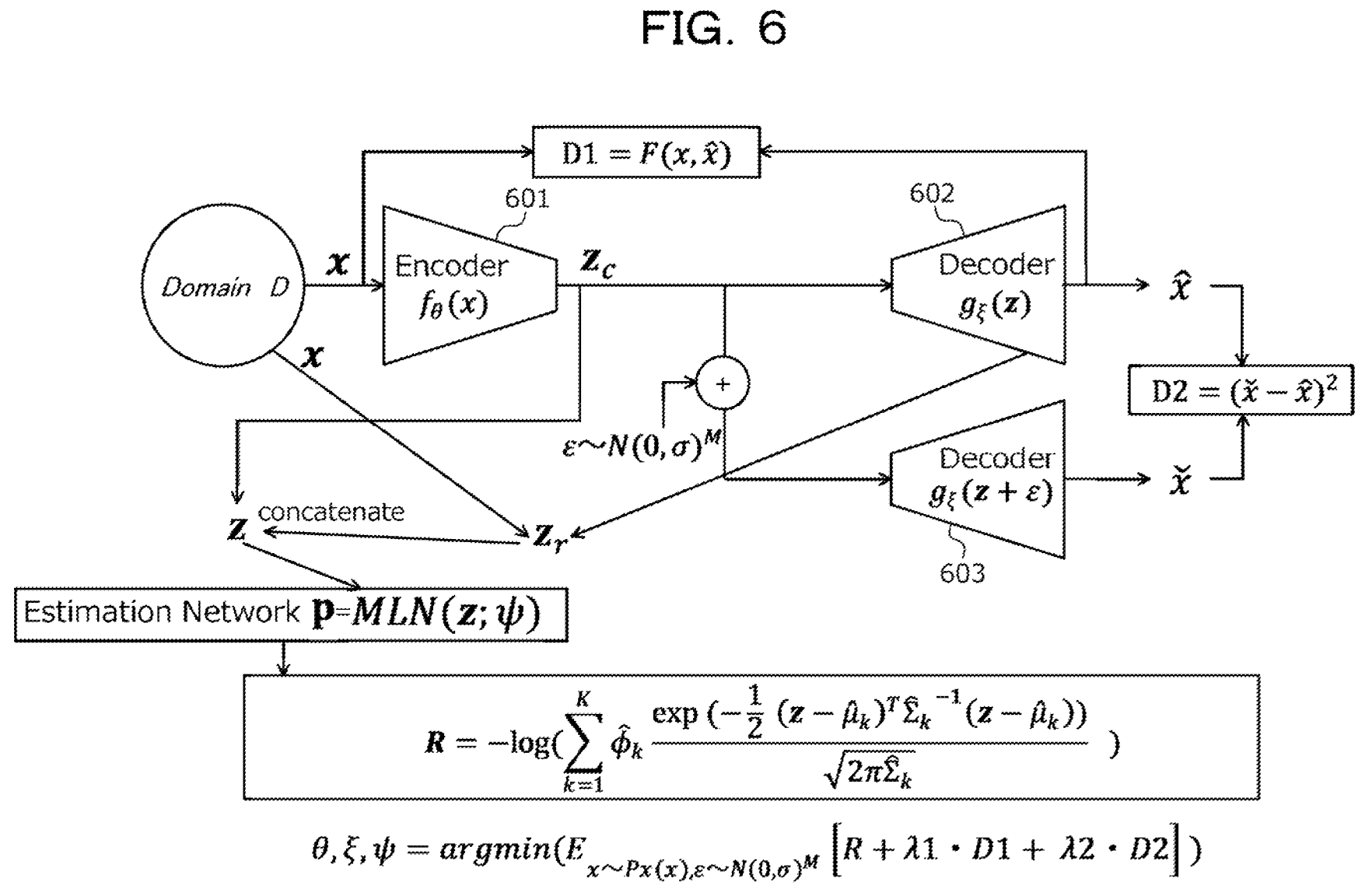

$$D2 = (\breve{x} - \hat{x})^2$$

$$D1 = F(x, \hat{x})$$

Decoder $g_\xi(z)$  602

Decoder $g_\xi(z + \varepsilon)$  603

Encoder $f_\theta(x)$  601

$\varepsilon \sim N(0, \sigma)^M$

Domain $D$ concatenate

Estimation Network $\mathbf{p} = MLN(\mathbf{z}; \psi)$ $$R = -\log\left(\sum_{k=1}^{K} \hat{\phi}_k \frac{\exp\left(-\frac{1}{2}(\mathbf{z} - \hat{\mu}_k)^T \hat{\Sigma}_k^{-1}(\mathbf{z} - \hat{\mu}_k)\right)}{\sqrt{2\pi \hat{\Sigma}_k}}\right)$$

$$\theta, \xi, \psi = argmin\left(E_{x \sim Px(x), \varepsilon \sim N(0,\sigma)^M}\left[R + \lambda 1 \cdot D1 + \lambda 2 \cdot D2\right]\right)$$

TRAINING METHOD, STORAGE MEDIUM, AND TRAINING DEVICE

CROSS-REFERENCE TO RELATED APPLICATION

This application is a continuation application of International Application PCT/JP2019/037370 filed on Sep. 24, 2019 and designated the U.S., the entire contents of which are incorporated herein by reference.

FIELD

The present invention relates to a training method, a storage medium, and a training device.

BACKGROUND

Typically, in the field of data analysis, there is an autoencoder that extracts feature data, called a latent variable in a latent space having a relatively small number of dimensions, from real data in a real space having a relatively large number of dimensions. For example, there is a case where data analysis accuracy is improved by using the feature data extracted from the real data by the autoencoder, instead of the real data.

The related art, for example, learns a latent variable by performing unsupervised learning using a neural network. Furthermore, for example, there is a technique for learning the latent variable as a probability distribution. Furthermore, for example, there is a technique for learning the Gaussian mixture distribution expressing the probability distribution of the latent space at the same time as learning an autoencoder.

Non-Patent Document 1: Geoffrey E. Hinton; R. R. Salakhutdinov, "Reducing the Dimensionality of Data with Neural Networks", *Science* 313 (5786): 504-507, 2006-07-28

Non-Patent Document 2: Diederik P. Kingma, Max Welling, "Auto-Encoding Variational Bayes," *ICLR* 2014, Banff, Canada, April 2014

Non-Patent Document 3: Bo Zong, Qi Song, Martin Renqiang Min, Wei Cheng, Cristian Lumezanu, Daeki Cho, and Haifeng Chen, "Deep autoencoding gaussian mixture model for unsupervised anomaly detection", *International Conference on Learning Representations*, 2018

SUMMARY

According to an aspect of the embodiments, a training method of an autoencoder that performs encoding and decoding, for a computer to execute a process includes encoding input data by the autoencoder; obtaining a probability distribution of feature data obtained by encoding the input data by the autoencoder; generating first decoded data by decoding the feature data by the autoencoder; adding a noise to the feature data; generating second decoded data by decoding the feature data to which the noise is added by the autoencoder; and training the autoencoder to train the probability distribution of the feature data so that a first error between the first decoded data and the input data, a second error between the first decoded data and the second decoded data, and an information entropy of the probability distribution are decreased.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an explanatory diagram illustrating an example of a learning method according to an embodiment.

FIG. 4 is a block diagram illustrating a functional configuration example of the learning device 100.

FIG. 5 is an explanatory diagram illustrating a first example of the learning device 100.

FIG. 6 is an explanatory diagram illustrating a second example of the learning device 100.

DESCRIPTION OF EMBODIMENTS

Figure 2:
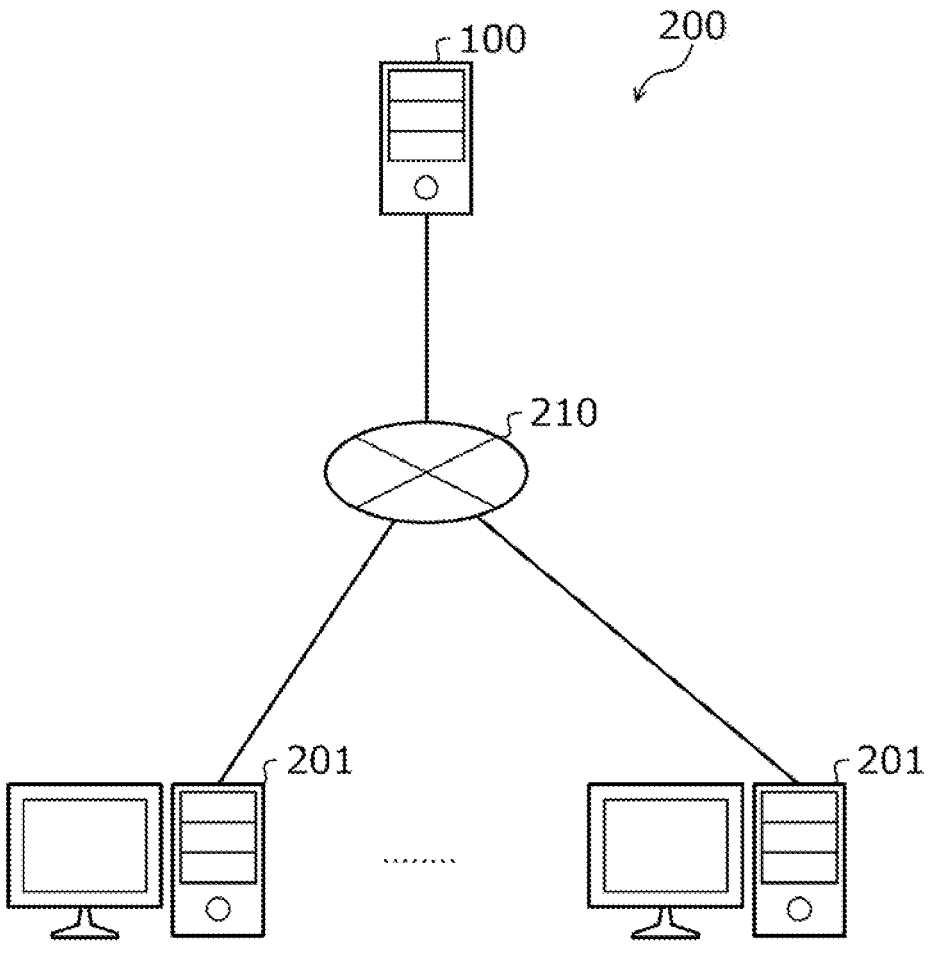
FIG. 2 is an explanatory diagram illustrating an example of a data analysis system 200.

In the related art, in a case where a probability distribution of feature data is used instead of a probability distribution of real data or the like, it is difficult to improve data analysis accuracy. For example, as a match degree between the probability distribution of the real data and the probability distribution of the feature data is smaller, it is more difficult to improve the data analysis accuracy.

In one aspect, an object of the present invention is to improve data analysis accuracy.

According to one aspect, it is possible to improve data analysis accuracy.

Hereinafter, an embodiment of a learning method, a learning program, and a learning device according to the present invention will be described in detail with reference to the drawings.

(Example of Learning Method According to Embodiment)

FIG. 1 is an explanatory diagram illustrating an example of a learning method according to an embodiment. In FIG. 1, a learning device 100 is a computer that learns an autoencoder. The autoencoder is a model that extracts feature data, called a latent variable, in a latent space having a relatively small number of dimensions from real data in a real space having a relatively large number of dimensions.

The autoencoder is used to improve efficiency of data analysis, for example, reducing a data analysis processing amount, improving data analysis accuracy, or the like. At the time of data analysis, it is considered to reduce the data analysis processing amount, improve the data analysis accuracy, or the like by using the feature data in the latent space having the relatively small number of dimensions, instead of the real data in the real space having the relatively large number of dimensions.

Specifically, an example of the data analysis is, for example, anomaly detection for determining whether or not target data is outlier data or the like. The outlier data is data indicating an outlier that is statistically hard to appear and has a relatively high possibility of being an abnormal value. At the time of anomaly detection, it is considered to use the probability distribution of the feature data in the latent space instead of the probability distribution of the real data in the real space. Then, it is considered to determine whether or not the target data is the outlier data in the real space on the basis of whether or not the feature data extracted from the target data by the autoencoder is the outlier data in the latent space.

However, in the related art, even if the probability distribution of the feature data in the latent space is used instead of the probability distribution of the real data in the real space, there is a case where it is difficult to improve the data analysis accuracy. Specifically, with the autoencoder according to the related art, it is difficult to match the probability distribution of the real data in the real space and the probability distribution of the feature data in the latent space and to make a probability density of the real data and a probability density of the feature data be proportional to each other.

Specifically, even if the autoencoder is learned with reference to Non-Patent Document 1 described above, it is not guaranteed to match the probability distribution of the real data in the real space and the probability distribution of the feature data in the latent space. Furthermore, even if the autoencoder is learned with reference to Non-Patent Document 2 described above, an independent normal distribution for each variable is assumed, and it is not guaranteed to match the probability distribution of the real data in the real space and the probability distribution of the feature data in the latent space. Furthermore, even if the autoencoder is learned with reference to Non-Patent Document 3 described above, because the probability distribution of the feature data in the latent space is limited, it is not guaranteed to match the probability distribution of the real data in the real space and the probability distribution of the feature data in the latent space.

Therefore, even if the feature data extracted from the target data by the autoencoder is the outlier data in the latent space, there is a case where the target data is not the outlier data in the real space, and there is a case where it is not possible to improve anomaly detection accuracy.

Therefore, in the present embodiment, a learning method will be described that can learn an autoencoder that easily matches the probability distribution of the real data in the real space and the probability distribution of the feature data in the latent space and can improve the data analysis accuracy.

In FIG. 1, the learning device 100 includes an autoencoder 110, before being updated, to be learned. The learning target includes, for example, an encoding parameter and a decoding parameter of the autoencoder 110. Before being updated means a state where the encoding parameter and the decoding parameter to be learned are before being updated.

(1-1) The learning device 100 generates feature data z obtained by encoding data x from a domain D to be a sample for learning the autoencoder 110. The feature data z is a vector of which the number of dimensions is less than that of the data x. The data x is a vector. The learning device 100 generates the feature data z corresponding to a function value $f_\theta(x)$ obtained by substituting the data x, for example, by an encoder 111 that achieves a function $f_\theta(\bullet)$ for encoding.

(1-2) The learning device 100 calculates a probability distribution $Pz_\psi(z)$ of the feature data z. For example, the learning device 100 calculates the probability distribution $Pz_\psi(z)$ of the feature data z on the basis of the model, before being updated, to be learned that defines a probability distribution. The learning target is, for example, a parameter $\psi$ that defines the probability distribution. Before being updated means a state where the parameter $\psi$ that defines the probability distribution to be learned is before being updated. Specifically, the learning device 100 calculates the probability distribution $Pz_\psi(z)$ of the feature data z according to a probability density function (PDF) including the parameter $\psi$. The probability density function is, for example, parametric.

(1-3) The learning device 100 generates first decoded data $x^\wedge$ by decoding the feature data z. The first decoded data $x^\wedge$ is a vector. Here, $x^\wedge$ in the text indicates a symbol adding $\wedge$ to the upper portion of x in the figures and formulas. The learning device 100 generates the first decoded data $x^\wedge$ corresponding to a function value $g_\xi(z)$ obtained by substituting the feature data z, for example, by a decoder 112 that achieves a function $g_\xi(\bullet)$ for decoding.

(1-4) The learning device 100 generates added data z+ε by adding a noise ε to the feature data z. The learning device 100, for example, generates the noise ε by a noise generator 113 and generates the added data z+ε. The noise ε is a uniform random number, based on a distribution of which an average is zero, that has dimensions as many as the feature data z and is uncorrelated between dimensions.

(1-5) The learning device 100 generates second decoded data $x^\vee$ by decoding the added data z+ε. The second decoded data $x^\vee$ is a vector. Here, $x^\vee$ in the text indicates a symbol adding v to the upper portion of x in the figures and formulas. The learning device 100 generates the second decoded data $x^\vee$ corresponding to a function value $g_\xi(z+\varepsilon)$ obtained by substituting the added data z+ε, for example, by a decoder 114 that achieves a function $g_\xi(\bullet)$ for decoding.

(1-6) The learning device 100 calculates a first error D1 between the generated first decoded data $x^\wedge$ and the data x. The learning device 100 calculates the first error D1 according to the following formula (1). F (x, $x^\wedge$) is the following formula (2) or (3). Furthermore, as long as a condition of the following formula (4) is satisfied, F (x, $x^\wedge$) may also be a formula other than the following formulas (2) and (3).

[Expression 1]

$$D1 = F(x, \hat{x}) \tag{1}$$

[Expression 2]

$$(x - \hat{x})^2 \tag{2}$$

[Expression 3]

$$\log((x - \hat{x})^2) \tag{3}$$

[Expression 4]

$$F'(x) = ax^p + O(x^{p-1}) p \le 1 \tag{4}$$

(1-7) The learning device 100 calculates a second error D2 between the first decoded data $x^\wedge$ and the generated second decoded data $x^\vee$. The learning device 100 calculates the second error D2, for example, according to the following formula (5).

[Expression 5]

$$D2 = (\check{x} - \hat{x})^2 \tag{5}$$

(1-8) The learning device 100 calculates an information entropy R of the calculated probability distribution $Pz_\psi(z)$. The information entropy R is a selected information amount and indicates difficulty of generating the feature data z. The learning device 100 calculates the information entropy R, for example, according to the following formula (6).

[Expression 6]

$$R = -\log(Pz_\psi(z)) \tag{6}$$

(1-9) The learning device 100 learns the autoencoder 110 and the probability distribution of the feature data z so as to minimize the calculated first error D1 and second error D2 and the information entropy R of the probability distribution. For example, the learning device 100 learns an encoding parameter θ of the autoencoder 110, a decoding parameter ξ of the autoencoder 110, and the parameter ψ of the model so as to minimize a weighted sum E according to the following formula (7). The weighted sum E is a sum of the first error D1 to which a weight λ1 is added, the second error D2 to which a weight λ2 is added, and the information entropy R of the probability distribution.

[Expression 7]

$$\theta, \xi, \psi = \mathrm{argmin}(E_{x \sim Px(x), \varepsilon \sim N(0,\sigma)} M[R + \lambda1 \cdot D1 + \lambda2 \cdot D2]) \tag{7}$$

As a result, the learning device 100 can learn the autoencoder 110 that can extract the feature data z from the input data x so that a proportional tendency appears between a probability density of the input data x and a probability density of the feature data z. Therefore, the learning device 100 may improve the data analysis accuracy by the learned autoencoder 110.

Here, for convenience, a case has been focused and described where the number of pieces of data x to be a sample for learning the autoencoder 110 is one. However, the number is not limited to this. For example, there may also be a case where the learning device 100 learns the autoencoder 110 on the basis of a set of the data x to be a sample for learning the autoencoder 110. In this case, the learning device 100 uses an average value of the first error D1 to which the weight λ1 is added, an average value of the second error D2 to which the weight λ2 is added, an average value of the information entropy R of the probability distribution, or the like in the above formula (7).

Here, a case has been described where, in the learning device 100, the decoders 112 and 114 are respectively implemented by different parts. However, the present invention is not limited to this. For example, there may also be a case where, in the learning device 100, the decoders 112 and 114 are implemented by a common part.

(Example of Data Analysis System 200)

Next, an example of the data analysis system 200 to which the learning device 100 illustrated in FIG. 1 is applied will be described with reference to FIG. 2.

FIG. 2 is an explanatory diagram illustrating an example of the data analysis system 200. In FIG. 2, the data analysis system 200 includes the learning device 100 and one or more terminal devices 201.

In the data analysis system 200, the learning device 100 and the terminal device 201 are connected via a wired or wireless network 210. The network 210 is, for example, a local area network (LAN), a wide area network (WAN), the Internet, or the like.

The learning device 100 receives a set of data to be a sample from the terminal device 201. The learning device 100 learns the autoencoder 110 on the basis of the received set of data to be a sample. The learning device 100 receives data to be a data analysis processing target from the terminal device 201 and provides a data analysis service to the terminal device 201 using the learned autoencoder 110. The data analysis is, for example, anomaly detection.

The learning device 100 receives, for example, data to be a processing target of anomaly detection from the terminal device 201. Next, the learning device 100 determines whether or not the received data to be processed is outlier data using the learned autoencoder 110. Then, the learning device 100 transmits a result of determining whether or not the received data to be processed is the outlier data to the terminal device 201. The learning device 100 is, for example, a server, a personal computer (PC), or the like.

The terminal device 201 is a computer that can communicate with the learning device 100. The terminal device 201 transmits data to be a sample to the learning device 100. The terminal device 201 transmits the data to be the data analysis processing target to the learning device 100 and uses the data analysis service. The terminal device 201 transmits, for example, the data to be the processing target of anomaly detection to the learning device 100. Then, the terminal device 201 receives the result of determining whether or not the transmitted data to be processed is the outlier data from the learning device 100. The terminal device 201 is, for example, a PC, a tablet terminal, a smartphone, a wearable terminal, or the like.

Here, a case has been described where the learning device 100 and the terminal device 201 are different devices. However, the present invention is not limited to this. For example, there may also be a case where the learning device 100 also operates as the terminal device 201. In this case, the data analysis system 200 does not need to include the terminal device 201.

Here, a case has been described where the learning device 100 receives the set of data to be a sample from the terminal device 201. However, the present invention is not limited to this. For example, there may also be a case where the learning device 100 accepts an input of the set of data to be a sample on the basis of a user's operation input. Furthermore, for example, there may also be a case where the learning device 100 reads the set of data to be a sample from an attached recording medium.

Here, a case has been described where the learning device 100 receives the data to be the data analysis processing target from the terminal device 201. However, the present invention is not limited to this. For example, there may also be a case where the learning device 100 accepts the input of the data to be the data analysis processing target on the basis of a user's operation input. Furthermore, for example, there may also be a case where the learning device 100 reads the data to be the data analysis processing target from an attached recording medium.

(Hardware Configuration Example of Learning Device 100)

Next, a hardware configuration example of the learning device 100 will be described with reference to FIG. 3.

Figure 3:
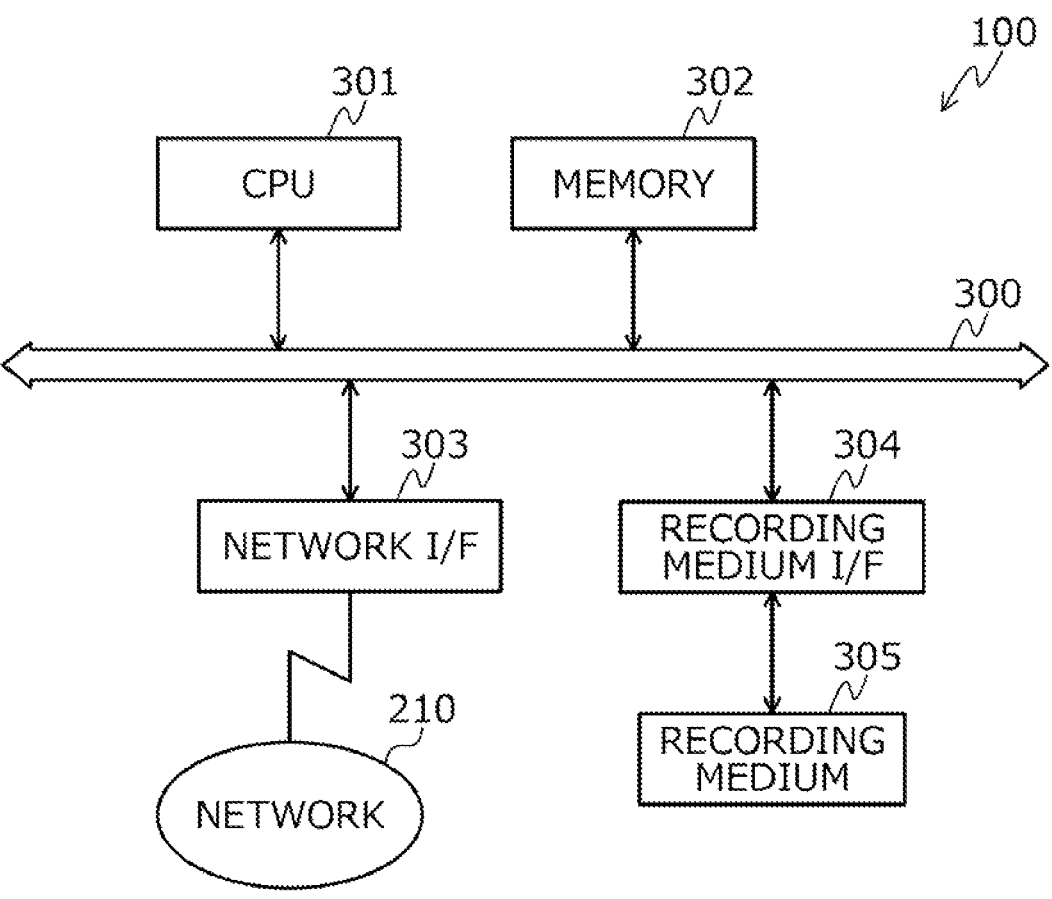
FIG. 3 is a block diagram illustrating a hardware configuration example of a learning device 100.

FIG. 3 is a block diagram illustrating a hardware configuration example of the learning device 100. In FIG. 3, the learning device 100 includes a central processing unit (CPU) 301, a memory 302, a network interface (I/F) 303, a recording medium I/F 304, and a recording medium 305. Furthermore, the individual components are connected to each other by a bus 300.

Here, the CPU 301 controls the entire learning device 100. For example, the memory 302 includes a read only memory (ROM), a random access memory (RAM), a flash ROM, and the like. Specifically, for example, the flash ROM or the ROM stores various programs, and the RAM is used as a work area for the CPU 301. The program stored in the memory 302 is loaded to the CPU 301 to cause the CPU 301 to execute coded processing.

The network I/F 303 is connected to the network 210 through a communication line and is connected to another computer via the network 210. Then, the network I/F 303 is in charge of an interface between the network 210 and the inside and controls input and output of data to and from another computer. For example, the network I/F 303 is a modem, a LAN adapter, or the like.

The recording medium I/F 304 controls reading and writing of data from and to the recording medium 305 under the control of the CPU 301. For example, the recording medium I/F 304 is a disk drive, a solid state drive (SSD), a universal serial bus (USB) port, or the like. The recording medium 305 is a nonvolatile memory that stores data written under the control of the recording medium I/F 304. The recording medium 305 includes, for example, a disk, a semiconductor memory, a USB memory, and the like. The recording medium 305 may also be attachable to and detachable from the learning device 100.

The learning device 100 may further include, for example, a keyboard, a mouse, a display, a printer, a scanner, a microphone, a speaker, or the like in addition to the above-described components. Furthermore, the learning device 100 may also include a plurality of the recording medium I/Fs 304 and the recording medium 305. Furthermore, the learning device 100 does not need to include the recording medium I/F 304 and the recording medium 305.

(Hardware Configuration Example of Terminal Device 201)

Because a hardware configuration example of the terminal device 201 is similar to the hardware configuration example of the learning device 100 illustrated in FIG. 3, description thereof will be omitted.

(Functional Configuration Example of Learning Device 100)

Next, a functional configuration example of the learning device 100 will be described with reference to FIG. 4.

FIG. 4 is a block diagram illustrating the functional configuration example of the learning device 100. The learning device 100 includes a storage unit 400, an acquisition unit 401, an encoding unit 402, a generation unit 403, a decoding unit 404, an estimation unit 405, an optimization unit 406, an analysis unit 407, and an output unit 408. The encoding unit 402 and the decoding unit 404 form the autoencoder 110.

The storage unit 400 is implemented by a storage region such as the memory 302, the recording medium 305, or the like illustrated in FIG. 3, for example. Hereinafter, a case will be described where the storage unit 400 is included in the learning device 100. However, the present invention is not limited to this. For example, the storage unit 400 may be included in a device different from the learning device 100, and content stored in the storage unit 400 may also be able to be referred to by the learning device 100.

The acquisition unit 401 through the output unit 408 function as an example of a control unit. Specifically, for example, the acquisition unit 401 through the output unit 408 implement functions thereof by causing the CPU 301 to execute a program stored in the storage region such as the memory 302, the recording medium 305, or the like illustrated in FIG. 3 or by the network I/F 303. A processing result of each functional unit is stored in the storage region such as the memory 302 or the recording medium 305 illustrated in FIG. 3, for example.

The storage unit 400 stores various types of information to be referred to or updated in the processing of each functional unit. The storage unit 400 stores the encoding parameter and the decoding parameter. The storage unit 400 stores, for example, the parameter $\theta$ that defines a neural network for encoding, used by the encoding unit 402. The storage unit 400 stores, for example, the parameter $\xi$ that defines a neural network for decoding, used by the decoding unit 404.

The storage unit 400 stores a pre-update model to be learned that defines the probability distribution. The model is, for example, a probability density function. The model is, for example, a Gaussian mixture model (GMM). A specific example in which the model is a Gaussian mixture model will be described later in a first example with reference to FIG. 5. The model has the parameter $\psi$ that defines the probability distribution. Before being updated means a state where the parameter $\psi$ to be learned that defines the probability distribution of the model is before being updated. Furthermore, the storage unit 400 stores various functions used for the processing of each functional unit.

The acquisition unit 401 acquires various types of information to be used for the processing of each functional unit. The acquisition unit 401 stores the acquired various types of information in the storage unit 400 or outputs the acquired various types of information to each functional unit. Furthermore, the acquisition unit 401 may also output various types of information stored in the storage unit 400 to each functional unit. The acquisition unit 401 may also acquire various types of information on the basis of a user's operation input. The acquisition unit 401 may also receive various types of information from a device different from the learning device 100.

The acquisition unit 401, for example, accepts inputs of various types of data. The acquisition unit 401, for example, accepts inputs of one or more pieces of data to be a sample for learning the autoencoder 110. In the following description, there may be a case where the data to be the sample for learning the autoencoder 110 is expressed as "sample data". Specifically, the acquisition unit 401 accepts an input of the sample data by receiving the sample data from the terminal device 201. Specifically, the acquisition unit 401 may also accept the input of the sample data on the basis of a user's operation input. As a result, the acquisition unit 401 can enable the encoding unit 402, the optimization unit 406, or the like to refer to a set of the sample data and to learn the autoencoder 110.

The acquisition unit 401 accepts, for example, inputs of one or more pieces of data to be the data analysis processing target. In the following description, there is a case where the data to be the data analysis processing target is expressed as "target data". Specifically, the acquisition unit 401 accepts an input of the target data by receiving the target data from the terminal device 201. Specifically, the acquisition unit 401 may also accept the input of the target data on the basis of a user's operation input. As a result, the acquisition unit 401 can enable the encoding unit 402 or the like to refer to the target data and to perform data analysis.

The acquisition unit 401 may also accept a start trigger to start the processing of any one of the functional units. The start trigger may also be a signal that is periodically generated in the learning device 100. The start trigger may also be, for example, a predetermined operation input by a user. The start trigger may also be, for example, receipt of predetermined information from another computer. The start trigger may also be, for example, output of predetermined information by any one of the functional units.

The acquisition unit 401 accepts, for example, the receipt of the input of the sample data to be a sample as the start trigger to start processing of the encoding unit 402 through the optimization unit 406. As a result, the acquisition unit 401 can start processing for learning the autoencoder 110. The acquisition unit 401 accepts, for example, receipt of the input of the target data as a start trigger to start processing of the encoding unit 402 through the analysis unit 407. As a result, the acquisition unit 401 can start processing for performing data analysis.

The encoding unit 402 encodes various types of data. The encoding unit 402 encodes, for example, the sample data. Specifically, the encoding unit 402 encodes the sample data by the neural network for encoding so as to generate feature data. In the neural network for encoding, the number of nodes of an output layer is less than the number of nodes of an input layer, and the feature data has the number of dimensions less than that of the sample data. The neural network for encoding is defined, for example, by the parameter θ. As a result, the encoding unit 402 can enable the estimation unit 405, the generation unit 403, and the decoding unit 404 to refer to the feature data obtained by encoding the sample data.

Furthermore, the encoding unit 402 encodes, for example, the target data. Specifically, the encoding unit 402 encodes the target data by the neural network for encoding so as to generate the feature data. As a result, the encoding unit 402 can enable the analysis unit 407 or the like to refer to the feature data obtained by encoding the target data.

The generation unit 403 generates a noise and adds the noise to the feature data obtained by encoding the sample data so as to generate the feature data. The noise is a uniform random number, based on a distribution of which an average is zero, that has dimensions as many as the feature data and is uncorrelated between dimensions. As a result, the generation unit 403 can generate the added feature data to be processed by the decoding unit 404.

The decoding unit 404 decodes the feature data obtained by encoding the sample data so as to generate first decoded data. For example, the decoding unit 404 decodes the feature data obtained by encoding the sample data by a first neural network for decoding so as to generate the first decoded data. It is preferable that the first neural network for decoding can have the number of nodes of the output layer less than the number of nodes of the input layer and can generate the first decoded data having the same number of dimensions as the sample data. The first neural network for decoding is defined, for example, by the parameter ξ. As a result, the decoding unit 404 can enable the optimization unit 406 or the like to refer to the first decoded data to be an index for learning the autoencoder 110.

Furthermore, the decoding unit 404 decodes the added feature data so as to generate second decoded data. For example, the decoding unit 404 decodes the added feature data by a second neural network for decoding so as to generate the second decoded data. It is preferable that the second neural network for decoding can have the number of nodes of the input layer less than the number of nodes of the output layer and can generate the second decoded data having the same number of dimensions as the sample data. The second neural network for decoding is defined, for example, by the parameter ξ. The first neural network and the second neural network are, for example, the same neural network. As a result, the decoding unit 404 can enable the optimization unit 406 or the like to refer to the second decoded data to be an index for learning the autoencoder 110.

The estimation unit 405 calculates the probability distribution of the feature data. The estimation unit 405 calculates the probability distribution of the feature data obtained by encoding the sample data, for example, on the basis of a model that defines the probability distribution. Specifically, the estimation unit 405 parametrically calculates the probability distribution of the feature data obtained by encoding the sample data. A specific example in which the probability distribution is parametrically calculated will be described later, for example, in a third example. As a result, the estimation unit 405 can enable the optimization unit 406 or the like to refer to the probability distribution of the feature data obtained by encoding the sample data, to be the index for learning the autoencoder 110.

The estimation unit 405 may also calculate the probability distribution of the feature data obtained by encoding the sample data, for example, on the basis of a similarity between the first decoded data and the sample data. The similarity is, for example, a cosine similarity or a relative Euclidean distance, or the like. The estimation unit 405 combines the similarity between the first decoded data and the sample data with the feature data obtained by encoding the sample data, and then, calculates the probability distribution of the combined feature data. A specific example using the similarity between the first decoded data and the sample data will be described later in a second example, for example, with reference to FIG. 6. As a result, the estimation unit 405 can enable the optimization unit 406 or the like to refer to the probability distribution of the combined feature data to be the index for learning the autoencoder 110.

The estimation unit 405 calculates the probability distribution of the feature data obtained by encoding the target data, for example, on the basis of the model that defines the probability distribution. Specifically, the estimation unit 405 parametrically calculates the probability distribution of the feature data obtained by encoding the target data. As a result, the estimation unit 405 can enable the analysis unit 407 or the like to refer to the probability distribution of the feature data obtained by encoding the target data to be the index for performing data analysis.

The optimization unit 406 learns the autoencoder 110 and the probability distribution of the feature data so as to minimize a first error between the first decoded data and the sample data, a second error between the first decoded data and the second decoded data, and an information entropy of the probability distribution.

The first error is calculated on the basis of an error function that is defined so that a differentiated result satisfies a predetermined condition. The first error is, for example, a squared error between the first decoded data and the sample data. The first error may also be, for example, a logarithm of the squared error between the first decoded data and the sample data. For example, when $\delta X$ is an arbitrary microvariation of X, A (X) is an N×N Hermitian matrix dependent on X, L (X) is a Cholesky decomposition matrix of A (X), the first error may also be an error such that an error between the first decoded data and the sample data can be approximated by the following formula (8). Such an error includes, for example, (1−SSIM) in addition to the squared error. Furthermore, the first error may also be a logarithm of (1−SSIM).

[Expression 8]

$$D(X,X+\delta X) \cong t\delta X \cdot A(X) \cdot \delta X = \|L(X) \cdot \delta X\|_2 \tag{8}$$

The second error is, for example, a squared error between the first decoded data and the second decoded data. When $\delta X$ is an arbitrary microvariation of X, A (X) is an N×N Hermitian matrix dependent on X, L (X) is a Cholesky decomposition matrix of A (X), the second error may also be an error such that the first decoded data and the second decoded data can be approximated by the above formula (8). Such an error includes, for example, (1−SSIM) in addition to the squared error.

The optimization unit 406 learns the autoencoder 110 and the probability distribution of the feature data, for example, so as to minimize a weighted sum of the first error, the second error, and the information entropy. Specifically, the optimization unit 406 learns the encoding parameter and the decoding parameter of the autoencoder 110 and the parameter of the model.

The encoding parameter is the parameter $\theta$ of the neural network for encoding described above. The decoding parameter is the parameter $\xi$ of the first neural network and the second neural network for decoding described above. The parameter of the model is the parameter $\psi$ of the Gaussian mixture model. A specific example in which the parameter $\psi$ of the Gaussian mixture model is learned will be described later in the first example, for example, with reference to FIG. 5.

As a result, the optimization unit 406 can learn the autoencoder 110 that can extract feature data from input data so that a proportional tendency appears between a probability density of the input data and a probability density of the feature data. The optimization unit 406 can learn the autoencoder 110, for example, by updating the parameters $\theta$ and $\xi$ respectively used by the encoding unit 402 and the decoding unit 404 forming the autoencoder 110.

The analysis unit 407 performs data analysis on the basis of the learned autoencoder 110 and the learned probability distribution of the feature data. The analysis unit 407 performs data analysis, for example, on the basis of the learned autoencoder 110 and the learned model. The data analysis is, for example, anomaly detection. The analysis unit 407 performs anomaly detection regarding the target data, for example, on the basis of the encoding unit 402 and the decoding unit 404 corresponding to the learned autoencoder 110 and the learned model.

Specifically, the analysis unit 407 acquires the probability distribution calculated by the estimation unit 405 on the basis of the learned model, regarding the feature data obtained by encoding the target data by the encoding unit 402 corresponding to the learned autoencoder 110. The analysis unit 407 performs anomaly detection on the target data on the basis of the acquired probability distribution. As a result, the analysis unit 407 can accurately perform data analysis.

The output unit 408 outputs a processing result of any one of the functional units. An output format is, for example, display on a display, print output to a printer, transmission to an external device by the network I/F 303, or storage in a storage region such as the memory 302 or the recording medium 305. As a result, the output unit 408 makes it possible to notify the user of the processing result of any one of the functional units, and may improve convenience of the learning device 100.

Specifically, the output unit 408 outputs the parameter $\theta$ for encoding and the parameter $\xi$ for decoding used to achieve the learned autoencoder 110. As a result, the output unit 408 can enable another computer to use the learned autoencoder 110. The output unit 408 outputs, for example, a result of performing anomaly detection. As a result, the output unit 408 can enable another computer to refer to the result of performing anomaly detection.

Here, a case has been described where the learning device 100 includes the acquisition unit 401 through the output unit

408. However, the present invention is not limited to this. For example, there may also be a case where another computer different from the learning device 100 includes any one of the functional units including the acquisition unit 401 through the output unit 408 and the learning device 100 and another computer cooperate with each other. Specifically, there may also be a case where the learning device 100 transmits the learned autoencoder 110 and the learned model to another computer including the analysis unit 407 and the another computer can perform data analysis.

(First Example of Learning Device 100)

Next, the first example of the learning device 100 will be described with reference to FIG. 5. In the first example, the learning device 100 calculates the probability distribution $Pz_\psi$ (z) of the feature data z in the latent space according to a multidimensional Gaussian mixture model. Regarding the multidimensional Gaussian mixture model, for example, Non-Patent Document 3 described above can be referred to.

FIG. 5 is an explanatory diagram illustrating the first example of the learning device 100. In FIG. 5, the learning device 100 acquires a plurality of pieces of data x to be a sample for learning the autoencoder 110, from the domain D. In the example in FIG. 5, the learning device 100 acquires a set of N pieces of data x.

(5-1) The learning device 100 generates the feature data z by encoding the data x by an encoder 501 each time when the data x is acquired. The encoder 501 is a neural network defined by the parameter $\theta$.

(5-2) The learning device 100 calculates a parameter p of the Gaussian mixture distribution corresponding to the feature data z each time when the feature data z is generated. The parameter p is a vector. For example, the learning device 100 calculates p corresponding to the feature data z by an Estimation Network p=MLN (z; $\psi$) that uses the feature data z as an input, is defined by the parameter $\psi$, and estimates the parameter p of the Gaussian mixture distribution. The MLN is a multi-layer neural network. Regarding the Estimation Network, for example, Non-Patent Document 3 described above can be referred to.

(5-3) The learning device 100 generates the first decoded data $x^\wedge$ by decoding the feature data z by a decoder 502 each time when the feature data z is generated. The decoder 502 is a neural network defined by the parameter $\xi$.

(5-4) The learning device 100 generates the added data z+ε by adding the noise ε to the feature data z each time when the feature data z is generated. The noise ε is a uniform random number, based on a distribution of which an average is zero, that has dimensions as many as the feature data z and is uncorrelated between dimensions.

(5-5) The learning device 100 generates the second decoded data $x^\vee$ by decoding the added data z+ε by a decoder 503 each time when the added data z+ε is generated. The decoder 503 is a neural network defined by the parameter $\xi$. For convenience, in the figure, the decoder 503 is illustrated as a part different from the decoder 502. However, the decoder 503 may also be the same part as the decoder 502.

(5-6) The learning device 100 calculates the first error D1 between the first decoded data $x^\wedge$ and the data x for each combination of the first decoded data $x^\wedge$ and the data x according to the formula (1) described above.

(5-7) The learning device 100 calculates the second error D2 between the first decoded data $x^\wedge$ and the second decoded data $x^\vee$ for each combination of the first decoded data $x^\wedge$ and the second decoded data $x^\vee$ according to the formula (5) described above.

(5-8) The learning device 100 calculates the information entropy R on the basis of N parameters p calculated from N pieces of feature data z. The information entropy R is, for example, an average information amount. The learning device 100 calculates the information entropy R, for example, according to the following formulas (9) to (13). Here, a number of the data x is defined as i. i=1, 2, . . . , N is satisfied. A component of the multidimensional Gaussian mixture model is defined as k. k=1, 2, . . . , and K is satisfied.

Specifically, the learning device 100 calculates a burden rate $\gamma^\wedge$ of the sample according to the following formula (9). Here, $\gamma^\wedge$ in the text indicates a symbol adding $\wedge$ to the upper portion of $\gamma$ in the figures and formulas.

[Expression 9]

$$\hat{\gamma} = \text{softmax}(p) \tag{9}$$

Next, the learning device 100 calculates a mixture weight $\varphi_k{}^\wedge$ of the Gaussian mixture distribution according to the following formula (10). Here, $\varphi_k{}^\wedge$ in the text indicates a symbol adding $\wedge$ to the upper portion of $\varphi_k$ in the figures and formulas.

[Expression 10]

$$\hat{\phi}_k = \sum_{i=1}^{N} \frac{\hat{\gamma}_{ik}}{N} \tag{10}$$

Next, the learning device 100 calculates an average $\mu_k{}^\wedge$ of the Gaussian mixture distribution according to the following formula (11). Here, $\mu_k{}^\wedge$ in the text indicates a symbol adding $\wedge$ to the upper portion of $\varphi_k$ in the figures and formulas. The reference $z_i$ is i-th encoded data z obtained by encoding i-th data x.

[Expression 11]

$$\hat{\mu}_k = \frac{\sum_{i=1}^{N} \hat{\gamma}_{ik} z_i}{\sum_{i=1}^{N} \hat{\gamma}_{ik}} \tag{11}$$

Next, the learning device 100 calculates a variance-covariance matrix $\Sigma_k{}^\wedge$ of the Gaussian mixture distribution according to the following formula (12). Here, $\Sigma_k{}^\wedge$ in the text indicates a symbol adding $\wedge$ to the upper portion of $\Sigma_k$ in the figures and formulas.

[Expression 12]

$$\hat{\sum_k} = \frac{\sum_{i=1}^{N} \hat{\gamma}_{ik}(z_i - \hat{\mu}_k)(z_i - \hat{\mu}_k)^T}{\sum_{i=1}^{N} \hat{\gamma}_{ik}} \tag{12}$$

Then, the learning device 100 calculates the information entropy R according to the following formula (13).

$$R = -\log\left(\sum_{k=1}^{K} \hat{\phi}_k \frac{\exp\left(-\frac{1}{2}(z - \hat{\mu}_k)^T \hat{\sum_k}^{-1} (z - \hat{\mu}_k)\right)}{\sqrt{2\pi\hat{\sum_k}}}\right) \tag{13}$$

(5-9) The learning device 100 learns the parameter θ of the encoder 501, the parameter ξ of the decoders 502 and 503, and the parameter ψ of the Gaussian mixture distribution so as to minimize the weighted sum E according to the formula (7) described above. The weighted sum E is a sum of the first error D1 to which the weight λ1 is added, the second error D2 to which the weight λ2 is added, and the information entropy R. As the first error D1 and the second error D2 in the formula, an average value of the calculated first error D1, an average value of the calculated second error D2, or the like can be adopted.

As a result, the learning device 100 can learn the autoencoder 110 that can extract the feature data z from the input data x so that a proportional tendency appears between a probability density of the input data x and a probability density of the feature data z. Therefore, the learning device 100 may improve the data analysis accuracy by the learned autoencoder 110. For example, the learning device 100 may improve accuracy of anomaly detection.

(Second Example of Learning Device 100)

Next, the second example of the learning device 100 will be described with reference to FIG. 6. In the second example, the learning device 100 uses an explanatory variable $z_r$ for feature data $z_c$ in the latent space.

FIG. 6 is an explanatory diagram illustrating the second example of the learning device 100. In FIG. 6, the learning device 100 acquires a plurality of pieces of data x to be a sample for learning the autoencoder 110 from the domain D. In the example in FIG. 6, the learning device 100 acquires a set of N pieces of data x.

(6-1) The learning device 100 generates the feature data $z_c$ by encoding the data x by an encoder 601 each time when the data x is acquired. The encoder 601 is a neural network defined by the parameter θ.

(6-2) The learning device 100 generates the first decoded data $x^\wedge$ by decoding the feature data $z_c$ by a decoder 602 each time when the feature data $z_c$ is generated. The decoder 602 is a neural network defined by the parameter ξ.

(6-3) The learning device 100 generates added data $z_c+\varepsilon$ by adding the noise ε to the feature data $z_c$ each time when the feature data $z_c$ is generated. The noise ε is a uniform random number, based on a distribution of which an average is zero, that has dimensions as many as the feature data $z_c$ and is uncorrelated between dimensions.

(6-4) The learning device 100 generates the second decoded data $x^\vee$ by decoding the added data $z_c+\varepsilon$ by a decoder 603 each time when the added data $z_c+\varepsilon$ is generated. The decoder 603 is a neural network defined by the parameter ξ. For convenience, in the figure, the decoder 603 is illustrated as a part different from the decoder 602. However, the decoder 603 may also be the same part as the decoder 602.

(6-5) The learning device 100 calculates the first error D1 between the first decoded data $x^\wedge$ and the data x for each combination of the first decoded data $x^\wedge$ and the data x according to the formula (1) described above.

(6-6) The learning device 100 calculates the second error D2 between the first decoded data $x^\wedge$ and the second decoded data $x^\vee$ for each combination of the first decoded data $x^\wedge$ and the second decoded data $x^\vee$ according to the formula (5) described above.

(6-7) The learning device 100 generates combined data z by combining the explanatory variable $z_r$ with the feature data $z_c$ each time when the feature data $z_c$ is generated. The explanatory variable $z_r$ is, for example, a cosine similarity, a relative Euclidean distance, or the like. The explanatory variable $z_r$ is, specifically, a cosine similarity $(x \cdot x^\wedge)/(|x| \cdot |^\wedge|)$, a relative Euclidean distance $(x - x^\wedge)/|x|$, or the like.

(6-8) The learning device 100 calculates p corresponding to the combined data z by the Estimation Network p=MLN (z; ψ) each time when the combined data z is generated.

(6-9) The learning device 100 calculates the information entropy R on the basis of N parameters p calculated from N pieces of combined data z according to the formulas (9) to (13) described above. The information entropy R is, for example, an average information amount.

(6-10) The learning device 100 learns the parameter θ of the encoder 601, the parameter ξ of the decoders 602 and 603, and the parameter ψ of the Gaussian mixture distribution so as to minimize the weighted sum E according to the formula (7) described above. The weighted sum E is a sum of the first error D1 to which the weight λ1 is added, the second error D2 to which the weight λ2 is added, and the information entropy R. As the first error D1 and the second error D2 in the formula, an average value of the calculated first error D1, an average value of the calculated second error D2, or the like can be adopted.

As a result, the learning device 100 can learn the autoencoder 110 that can extract the feature data z from the input data x so that a proportional tendency appears between a probability density of the input data x and a probability density of the feature data z. Furthermore, the learning device 100 can learn the autoencoder 110 that can extract the feature data z from the input data x so that the number of dimensions of the feature data z becomes relatively small. Therefore, the learning device 100 can relatively largely improve the data analysis accuracy by the learned autoencoder 110. For example, the learning device 100 can relatively largely improve the accuracy of anomaly detection.

(Third Example of Learning Device 100)

Next, the third example of the learning device 100 will be described. In the third example, the learning device 100 assumes a probability distribution $Pz_\psi$ (z) of z as an independent distribution and estimates the probability distribution $Pz_\psi$ (z) of z as a parametric probability density function. For estimating the probability distribution $Pz_\psi$ (z) of z as a parametric probability density function, for example, Non-Patent Document 4 described below can be referred.

Non-Patent Document 4: Johannes Balle, David Minnen, Saurabh Singh, Sung Jin Hwang, and Nick Johnston, "Variational image compression with a scale hyperprior", *International Conference on Learning Representations (ICLR)*, 2018.

As a result, the learning device 100 can learn the autoencoder 110 that can extract the feature data z from the input data x so that a proportional tendency appears between a probability density of the input data x and a probability density of the feature data z. Therefore, the learning device 100 may improve the data analysis accuracy by the learned autoencoder 110. For example, the learning device 100 may improve accuracy of anomaly detection.

(Example of Effect Obtained by Learning Device 100)

Next, an example of an effect obtained by the learning device 100 will be described with reference to FIG. 7.

Figure 7:
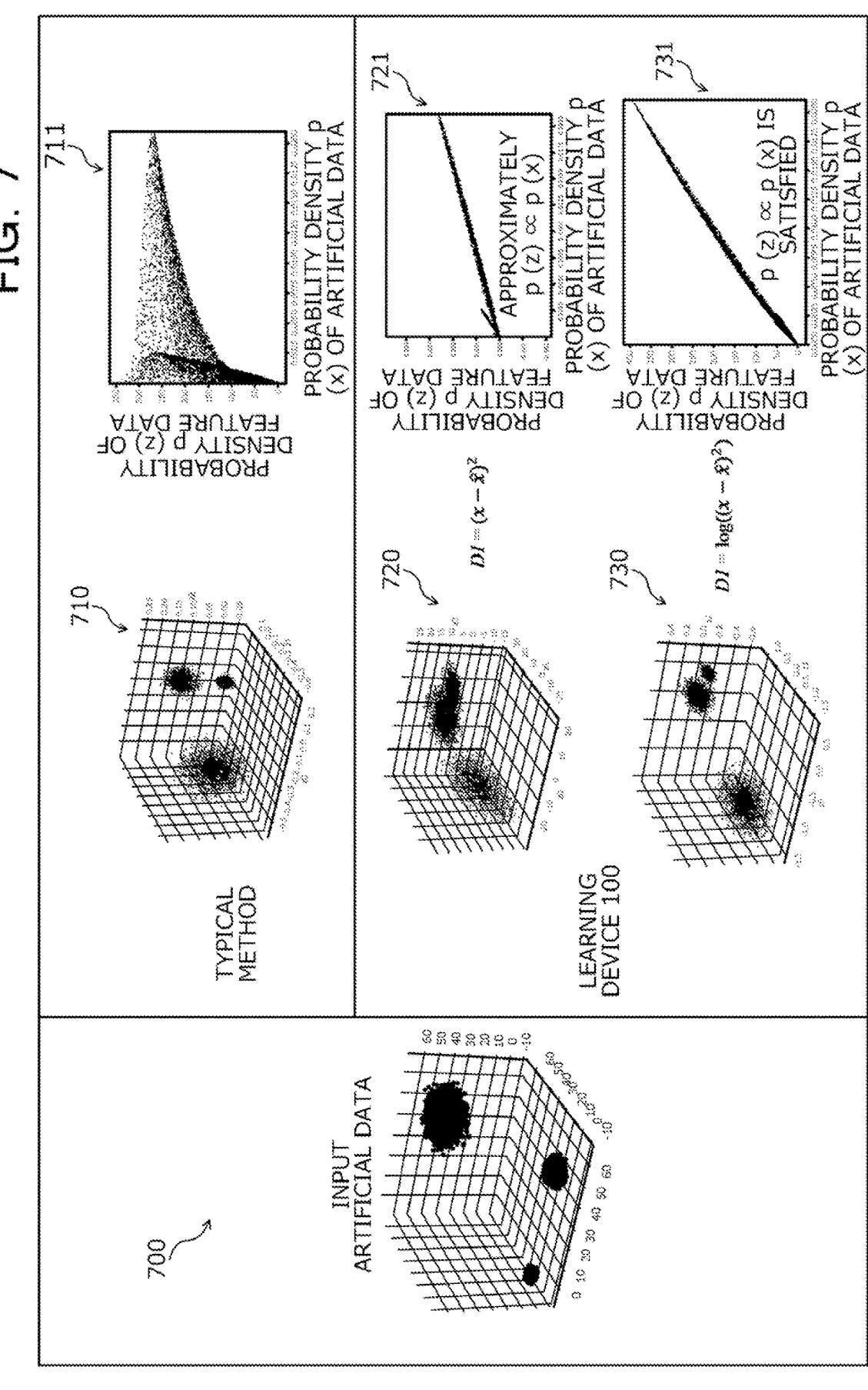
FIG. 7 is an explanatory diagram illustrating an example of an effect obtained by the learning device 100.

FIG. 7 is an explanatory diagram illustrating an example of the effect obtained by the learning device 100. In FIG. 7, artificial data x to be an input is illustrated. Specifically, a graph 700 in FIG. 7 is a graph illustrating a distribution of the artificial data x.

Here, a relationship between a distribution of the feature data z, a probability density p (x) of the artificial data x, and a probability density p (z) of the feature data z in a case where the feature data z is extracted from the artificial data x by an autoencoder a with the typical method is described.

Specifically, a graph 710 in FIG. 7 is a graph illustrating the distribution of the feature data z by the autoencoder a with the typical method. Furthermore, a graph 711 in FIG. 7 is a graph illustrating a relationship between the probability density p (x) of the artificial data x and the probability density p (z) of the feature data z by the autoencoder a with the typical method.

As illustrated in the graphs 710 and 711, with the autoencoder a with the typical method, the probability density p (x) of the artificial data x is not proportional to the probability density p (z) of the feature data z, and a linear relationship does not appear. Therefore, even if the feature data z according to the autoencoder a with the typical method is used instead of the artificial data x, it is difficult to improve the data analysis accuracy.

On the other hand, a case will be described where the learning device 100 extracts the feature data z from the artificial data x by an autoencoder 110-1 learned by using the formulas (1) and (2) described above. Specifically, a relationship between the distribution of the feature data z, the probability density p (x) of the artificial data x, and the probability density p (z) of the feature data z in this case will be described.

Specifically, a graph 720 in FIG. 7 is a graph illustrating a distribution of the feature data z by the autoencoder 110-1. Furthermore, a graph 721 in FIG. 7 is a graph illustrating a relationship between the probability density p (x) of the artificial data x and the probability density p (z) of the feature data z by the autoencoder 110-1.

As illustrated in the graphs 720 and 721, according to the autoencoder 110-1, the probability density p (x) of the artificial data x and the probability density p (z) of the feature data z tend to be proportional to each other, and a linear relationship appears. Therefore, the learning device 100 may improve the data analysis accuracy by using the feature data z according to the autoencoder 110-1, instead of the artificial data x. Furthermore, in a case of learning the autoencoder 110-1 using the formulas (1) and (2) described above, the learning device 100 may suppress an increase in a processing amount for learning.

Similarly, a case will be described where the learning device 100 extracts the feature data z from the artificial data x by an autoencoder 110-2 learned using the formulas (1) and (3) described above. Specifically, a relationship between the distribution of the feature data z, the probability density p (x) of the artificial data x, and the probability density p (z) of the feature data z in this case will be described.

Specifically, a graph 730 in FIG. 7 is a graph illustrating a distribution of the feature data z by the autoencoder 110-2. Furthermore, a graph 731 in FIG. 7 is a graph illustrating a relationship between the probability density p (x) of the artificial data x and the probability density p (z) of the feature data z by the autoencoder 110-2.

As illustrated in the graphs 730 and 731, according to the autoencoder 110-2, the probability density p (x) of the artificial data x and the probability density p (z) of the feature data z tend to be proportional to each other, and a linear relationship appears. Furthermore, as illustrated in the graphs 730 and 731, according to the autoencoder 110-2, a strong linear relationship can easily appear between the probability density p (x) of the artificial data x and the probability density p (z) of the feature data z. Therefore, the learning device 100 may more easily improve the data analysis accuracy using the feature data z according to the autoencoder 110-2 instead of the artificial data x.

(Learning Processing Procedure)

Next, an example of a learning processing procedure executed by the learning device 100 will be described with reference to FIG. 8. The learning processing is implemented by, for example, the CPU 301, the storage region such as the memory 302 or the recording medium 305, and the network I/F 303 illustrated in FIG. 3.

Figure 8:
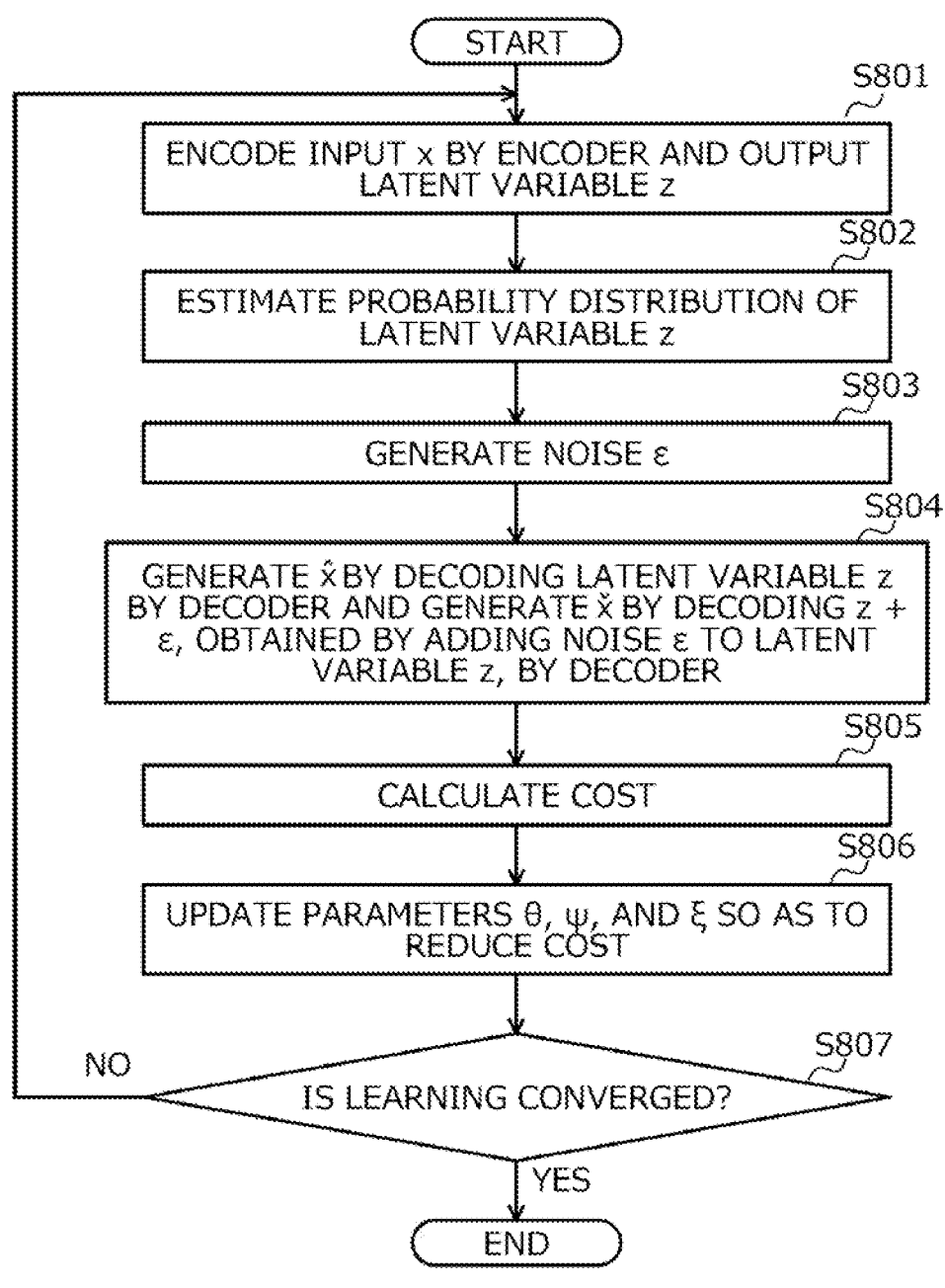
FIG. 8 is a flowchart illustrating an example of a learning processing procedure.

FIG. 8 is a flowchart illustrating an example of a learning processing procedure. In FIG. 8, the learning device 100 encodes an input x by an encoder and outputs a latent variable z (step S801). Next, the learning device 100 estimates a probability distribution of the latent variable z (step S802). Then, the learning device 100 generates a noise ε (step S803).

Next, the learning device 100 generates $x^{\wedge}$ by decoding the latent variable z by a decoder and generates $x^{\vee}$ by decoding z+ε, obtained by adding the noise ε to the latent variable z, by the decoder (step S804). Then, the learning device 100 calculates cost (step S805). The cost is the weighted sum E described above.

Next, the learning device 100 updates the parameters θ, ψ, and ξ so as to reduce the cost (step S806). Then, the learning device 100 determines whether or not learning is converged (step S807). Here, in a case where learning is not converged (step S807: No), the learning device 100 returns to the processing in step S801.

On the other hand, in a case where learning is converged (step S807: Yes), the learning device 100 ends the learning processing. The convergence of learning indicates, for example, that change amounts of the parameters θ, ψ, and ξ caused by update are equal to or less than a certain value. As a result, the learning device 100 can learn the autoencoder 110 that can extract the latent variable z from the input x so that a proportional tendency appears between a probability density of the input x and a probability density of the latent variable z.

(Analysis Processing Procedure)

Next, an example of an analysis processing procedure executed by the learning device 100 will be described with reference to FIG. 9. The analysis processing is implemented by, for example, the CPU 301, the storage region such as the memory 302 or the recording medium 305, and the network I/F 303 illustrated in FIG. 3.

Figure 9:
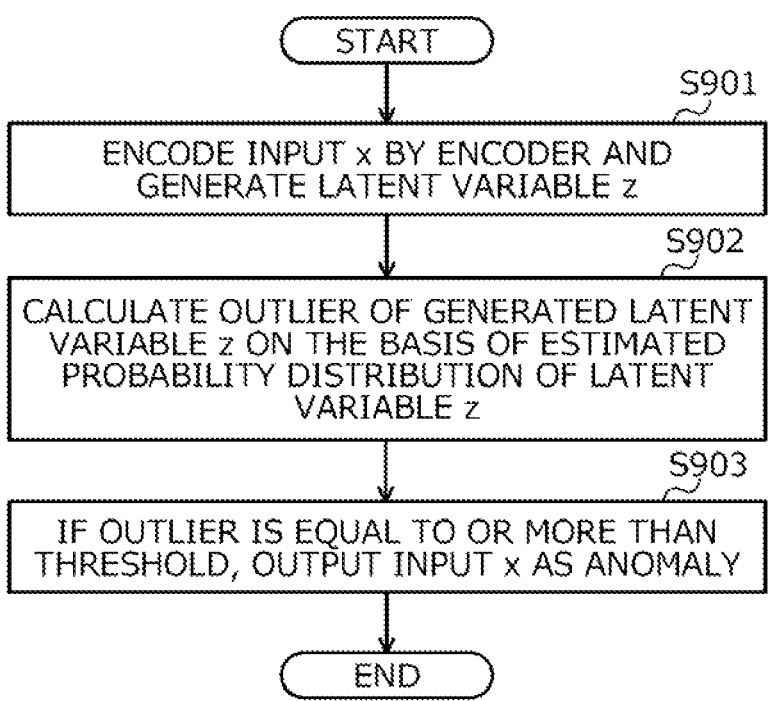
FIG. 9 is a flowchart illustrating an example of an analysis processing procedure.

FIG. 9 is a flowchart illustrating an example of the analysis processing procedure. In FIG. 9, the learning device 100 generates the latent variable z by encoding the input x by an encoder (step S901). Then, the learning device 100 calculates an outlier of the generated latent variable z on the basis of an estimated probability distribution of the latent variable z (step S902).

Next, if the outlier is equal to or more than a threshold, the learning device 100 outputs the input x as an anomaly (step S903). Then, the learning device 100 ends the analysis processing. As a result, the learning device 100 can accurately perform anomaly detection.

Here, the learning device 100 may also switch an order of the processing in some steps in FIG. 8 to be executed. For example, the order of the processing in steps S802 and S803 can be switched. For example, the learning device 100 starts to execute the learning processing described above in response to the receipt of the plurality of inputs x to be a sample used for the learning processing. For example, the learning device 100 starts to execute the analysis processing described above in response to the receipt of the input x to be processed in the analysis processing.

As described above, according to the learning device 100, it is possible to encode the input data x. According to the learning device 100, the probability distribution of the feature data z obtained by encoding the data x can be calculated. According to the learning device 100, it is possible to generate the first decoded data $x^{\wedge}$ by decoding the feature data z. According to the learning device 100, it is possible to add the noise ε to the feature data z. According to the learning device 100, it is possible to generate the second decoded data $x^{\vee}$ by decoding the feature data z+ε to which the noise ε is added. According to the learning device 100, it is possible to calculate the first error between the generated first decoded data $x^{\wedge}$ and the data x, the second error between the first decoded data $x^{\wedge}$ and the generated second decoded data $x^{\vee}$, and the information entropy of the calculated probability distribution. According to the learning device 100, it is possible to learn the autoencoder 110 and the probability distribution of the feature data z so as to minimize the first error, the second error, and the information entropy of the probability distribution. As a result, the learning device 100 can learn the autoencoder 110 that can extract the feature data z from the data x so that the proportional tendency appears between the probability density of the data x and the probability density of the feature data z. Therefore, the learning device 100 may improve the data analysis accuracy by the learned autoencoder 110.

According to the learning device 100, it is possible to calculate the probability distribution of the feature data z on the basis of the model that defines the probability distribution. According to the learning device 100, it is possible to learn the autoencoder 110 and the model that defines the probability distribution. As a result, the learning device 100 can optimize the autoencoder 110 and the model that defines the probability distribution.

According to the learning device 100, the Gaussian mixture model can be adopted as the model. According to the learning device 100, it is possible to learn the encoding parameter and the decoding parameter of the autoencoder 110 and the parameter of the Gaussian mixture model. As a result, the learning device 100 can optimize the encoding parameter and the decoding parameter of the autoencoder 110 and the parameter of the Gaussian mixture model.

According to the learning device 100, it is possible to calculate the probability distribution of the feature data z on the basis of the similarity between the first decoded data $x^{\wedge}$ and the data x. As a result, the learning device 100 can easily learn the autoencoder 110.

According to the learning device 100, it is possible to parametrically calculate the probability distribution of the feature data z. As a result, the learning device 100 can easily learn the autoencoder 110.

According to the learning device 100, as the noise ε, it is possible to adopt a uniform random number, based on a distribution of which an average is zero, that has dimensions as many as the feature data z and is uncorrelated between dimensions. As a result, the learning device 100 can ensure that the proportional tendency appears between the probability density of the data x and the probability density of the feature data z.

According to the learning device 100, it is possible to calculate the first error on the basis of the error function defined so that the differentiated result satisfies the predetermined condition. As a result, the learning device 100 can appropriately calculate the probability density of the data x and the first error.

According to the learning device 100, as the first error, the squared error between the first decoded data $x_\wedge$ and the data x can be adopted. As a result, the learning device 100 can suppress an increase in the processing amount required when the first error is calculated.

According to the learning device 100, as the first error, it is possible to adopt the logarithm of the squared error between the first decoded data $x_\wedge$ and the data x. As a result, the learning device 100 can make the strong proportional tendency easily appear between the probability density of the data x and the probability density of the feature data z.

According to the learning device 100, as the second error, it is possible to adopt the squared error between the first decoded data $x_\wedge$ and the second decoded data $x^\vee$. As a result, the learning device 100 can suppress an increase in the processing amount required when the second error is calculated.

According to the learning device 100, it is possible to perform anomaly detection on the input new data x on the basis of the learned autoencoder 110 and the learned probability distribution of the feature data z. As a result, the learning device 100 may improve the anomaly detection accuracy.

Note that the learning method described in the present embodiment may be implemented by executing a prepared program on a computer such as a personal computer (PC) or a workstation. The learning program described in the present embodiment is executed by being recorded on a computer-readable recording medium and being read from the recording medium by the computer. The recording medium is a hard disk, a flexible disk, a compact disc read only memory (CD-ROM), a magneto-optical disc (MO), a digital versatile disc (DVD), or the like. Furthermore, the learning program described in the present embodiment may also be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A training method implemented by a computer of training an autoencoder that is a neural network model including an encoder and a decoder, the training method comprising:

encoding input data by the encoder of the autoencoder to obtain feature data having fewer dimensions than the input data;

obtaining a probability distribution of the feature data obtained by inputting the feature data to a model trained to estimate, in response to the feature data, the probability distribution of the feature data;

generating first decoded data by decoding the feature data by the decoder of the autoencoder;

adding a noise to the feature data;

generating second decoded data by decoding, using the decoder of the autoencoder, the feature data to which the noise is added;

calculating a weighted sum of: a first error between the first decoded data and the input data, a second error between the first decoded data and the second decoded data, and an information entropy of the probability distribution; and training the autoencoder and the model by updating parameters of the autoencoder and parameters of the model so as to minimize the calculated weighted sum, thereby the autoencoder and the model are trained to enable the autoencoder to extract the feature data having a probability density that is proportional to a probability density of the input data.

2. The training method according to claim 1, wherein the model is a Gaussian mixture model, wherein the training includes training the autoencoder to train an encoding parameter of the autoencoder, a decoding parameter of the autoencoder, and a parameter of the Gaussian mixture model.

3. The training method according to claim 1, wherein the obtaining includes obtaining the probability distribution based on a similarity between the first decoded data and the input data.

4. The training method according to claim 1, wherein the obtaining includes obtaining the probability distribution parametrically.

5. The training method according to claim 1, wherein the noise is a uniform random number, based on a distribution of which an average is zero, that has dimensions as many as the feature data and is uncorrelated between dimensions.

6. The training method according to claim 1, wherein the first error is based on an error function defined so that a differentiated result satisfies a certain condition.

7. The training method according to claim 1, wherein the first error is a squared error between the first decoded data and the input data.

8. The training method according to claim 1, wherein the first error is a logarithm of the squared error between the first decoded data and the input data.

9. The training method according to claim 1, wherein the second error is a squared error between the first decoded data and the second decoded data.

10. The training method according to claim 1, wherein the process further comprising performing anomaly detection on input new data based on the trained autoencoder and the probability distribution.

11. A non-transitory computer-readable storage medium storing a training program of training an autoencoder that is a neural network model including an encoder and a decoder, the training program comprising instructions for causing at least one computer to execute a process, the process comprising:

encoding input data by the encoder of the autoencoder to obtain feature data having fewer dimensions than the input data;

obtaining a probability distribution of the feature data obtained by inputting the feature data to a model trained to estimate, in response to the feature data, the probability distribution of the feature data;

generating first decoded data by decoding the feature data by the decoder of the autoencoder;

adding a noise to the feature data;

generating second decoded data by decoding, using the decoder of the autoencoder, the feature data to which the noise is added; by the autoencoder; and calculating a weighted sum of: a first error between the first decoded data and the input data, a second error between the first decoded data and the second decoded data, and an information entropy of the probability distribution; and training the autoencoder and the model by updating parameters of the autoencoder and parameters of the model so as to minimize the calculated weighted sum, thereby the autoencoder and the model are trained to enable the autoencoder to extract the feature data having a probability density that is proportional to a probability density of the input data.

12. A training device of training an autoencoder that is a neural network model including an encoder and a decoder, the training device comprising:

one or more memories; and one or more processors coupled to the one or more memories and the one or more processors configured to:

encode input data by the encoder of the autoencoder to obtain feature data having fewer dimensions than the input data, obtain a probability distribution of the feature data obtained by inputting the feature data to a model trained to estimate, in response to the feature data, the probability distribution of the feature data, generate first decoded data by decoding the feature data by the decoder of the autoencoder, add a noise to the feature data, generate second decoded data by decoding, using the decoder of the autoencoder, the feature data to which the noise is added, calculate a weighted sum of: a first error between the first decoded data and the input data, a second error between the first decoded data and the second decoded data, and an information entropy of the probability distribution, and train the autoencoder and the model by updating parameters of the autoencoder and parameters of the model so as to minimize the calculated weighted sum, thereby the autoencoder and the model are trained to enable the autoencoder to extract the feature data having a probability density that is proportional to a probability density of the input data.

* * * * *